United States Patent
Li et al.

(10) Patent No.: US 10,219,148 B2
(45) Date of Patent: Feb. 26, 2019

(54) MOBILITY SUPPORT FOR VIRTUAL TERMINALS

(71) Applicant: FUJITSU LIMITED, Kawasaki-shi, Kanagawa (JP)

(72) Inventors: Zhaojun Li, Guildford Surrey (GB); Mick Wilson, Romsey Hampshire (GB); Timothy Moulsley, Caterham Surrey (GB)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 15/050,969

(22) Filed: Feb. 23, 2016

(65) Prior Publication Data
US 2016/0345167 A1 Nov. 24, 2016

(30) Foreign Application Priority Data
May 20, 2015 (GB) .................... 1508673.9

(51) Int. Cl.
*H04W 8/26* (2009.01)
*H04W 68/00* (2009.01)
(Continued)

(52) U.S. Cl.
CPC ............. *H04W 8/26* (2013.01); *H04L 67/08* (2013.01); *H04L 67/10* (2013.01); *H04L 69/14* (2013.01);
(Continued)

(58) Field of Classification Search
CPC ......... H04L 67/08; H04L 67/10; H04L 69/14; H04L 67/16; H04W 4/08; H04W 8/04;
(Continued)

(56) References Cited

U.S. PATENT DOCUMENTS

| 8,335,518 | B2 | 12/2012 | Park et al. |
| 2006/0265483 | A1* | 11/2006 | Wang .................... G06F 9/5055 709/223 |

(Continued)

FOREIGN PATENT DOCUMENTS

| EP | 2 592 884 A1 | 5/2013 |
| EP | 2 651 153 A1 | 10/2013 |

(Continued)

OTHER PUBLICATIONS

Patents Act 1977: Search Report under Section 17 issued for corresponding United Kingdom Patent Application No. GB1508673.9, dated Nov. 23, 2015.
(Continued)

*Primary Examiner* — Charles C Jiang
*Assistant Examiner* — Thad N Defauw
(74) *Attorney, Agent, or Firm* — Myers Wolin, LLC

(57) ABSTRACT

A wireless communication system includes a virtual terminal formed from one or more independent devices, a terminal management entity for managing the virtual terminal. The devices may be independent physical devices (smartphones, tablet computers), virtual machines/modules of physical devices, or a combination of both. The virtual terminal and terminal management entity communicate via a base station and/or access point. The terminal management entity creates a service ID for a service to be provided to the virtual terminal, the service ID being shared by the one or more independent devices, each having its own device ID. The TME forms an association of the virtual terminal with the network through use of a multi-homing transport protocol such as SCTP, the association supporting the service by using the service ID. For service delivery, paging and handover purposes the devices of the virtual terminal are treated as a single entity by the TME.

14 Claims, 5 Drawing Sheets

(51) Int. Cl.
*H04W 60/00* (2009.01)
*H04W 8/04* (2009.01)
*H04W 72/04* (2009.01)
*H04L 29/08* (2006.01)
*H04W 4/08* (2009.01)
*H04L 29/06* (2006.01)
*H04W 92/18* (2009.01)

(52) U.S. Cl.
CPC ............... *H04W 4/08* (2013.01); *H04W 8/04* (2013.01); *H04W 60/00* (2013.01); *H04W 68/00* (2013.01); *H04W 72/04* (2013.01); *H04L 67/16* (2013.01); *H04W 92/18* (2013.01)

(58) Field of Classification Search
CPC ..... H04W 60/00; H04W 68/00; H04W 72/04; H04W 92/18; H04W 8/26
See application file for complete search history.

(56) References Cited

U.S. PATENT DOCUMENTS

| | | | |
|---|---|---|---|
| 2009/0098884 A1 | 4/2009 | Casati et al. | |
| 2011/0201354 A1 | 8/2011 | Park et al. | |
| 2012/0039246 A1 | 2/2012 | Zhang et al. | |
| 2012/0226740 A1 | 9/2012 | Nath et al. | |
| 2012/0254349 A1 | 10/2012 | Quigley et al. | |
| 2013/0110994 A1* | 5/2013 | Kang | H04L 12/6418 709/220 |
| 2013/0304857 A1* | 11/2013 | Li | H04W 8/186 709/217 |
| 2013/0324157 A1 | 12/2013 | Park et al. | |
| 2014/0024368 A1 | 1/2014 | Jin et al. | |
| 2014/0113658 A1 | 4/2014 | Jin et al. | |
| 2014/0323102 A1* | 10/2014 | Lorca Hernando | H04W 4/001 455/414.1 |
| 2015/0009994 A1* | 1/2015 | Keesara | H04L 45/12 370/392 |
| 2015/0012986 A1* | 1/2015 | Sun | H04W 12/06 726/6 |
| 2016/0014712 A1* | 1/2016 | Belleschi | H04W 8/005 455/434 |
| 2016/0337007 A1* | 11/2016 | Seyedmehdi | H04B 7/024 |

FOREIGN PATENT DOCUMENTS

| | | |
|---|---|---|
| EP | 2 713 637 A2 | 4/2014 |
| EP | 2 779 717 A1 | 9/2014 |
| WO | 2013/048423 A1 | 4/2013 |
| WO | 2013/082628 A2 | 6/2013 |
| WO | 2013/082628 A3 | 6/2013 |

OTHER PUBLICATIONS

Extended European search report with supplementary European search report and the European search opinion issued by the European Patent Office for corresponding European Patent Application No. 16153231.2, dated Jul. 14, 2016.

* cited by examiner

MOBILITY SUPPORT FOR VIRTUAL TERMINALS

CROSS REFERENCES TO RELATED APPLICATIONS

This application claims priority from the United Kingdom Patent Application No. 1508673.9, filed May 20, 2015, the contents of which are herein wholly incorporated by reference.

FIELD OF THE INVENTION

This invention generally relates to a mobile communication system or network and in particular, to mechanisms for supporting mobility of so-called "virtual terminals", which can be formed of multiple devices sharing an identifier used in the mobile communication system.

BACKGROUND OF THE INVENTION

Embodiments of the present invention to be described can be applied to various kinds of Radio Access Technology (RAT), and to more than one RAT simultaneously. However, in order to introduce some of the concepts involved, some brief explanation will be made of relevant aspects of one such RAT, the Long-Term Evolution of 3GPP, usually abbreviated to LTE.

The basic system architecture in LTE is illustrated in FIG. 1. As can be seen, each mobile device (referred to in LTE as a UE) connects over a wireless link via a Uu interface to a base station (an eNB or eNodeB), which defines one or a number of cells for wireless communication.

Each eNB in turn is connected by a (usually) wired link using an S1 interface to higher-level or "core network" entities, including a Serving Gateway (S-GW) and a Mobility Management Entity (MME) for managing the system and sending control signalling to other nodes, particularly eNBs, in the network. The S1 interface can be subdivided into S1-U, the suffix -U denoting the user plane employed by the eNBs 11 for communicating user data to and from the S-GW; and S1-MME (sometimes called S1-C) for the control plane via which the eNBs exchange control messages with the MME.

The S-GW is responsible for packet forwarding of user data on the downlink to the UE and on the uplink. The S-GW provides a "mobility anchor" for the user plane during handovers of a UE from one eNB to another. It also manages and stores UE "contexts" which are the details of active connections with UEs.

The main function of the MME, as its name suggests, is to manage mobility of the UEs, and it is a signalling-only entity; in other words, user data packets do not pass through the MME. One eNB can have several S1-MME interfaces towards several MMEs. One function of the MME is to keep track of UEs as they move around the network: the MME maintains a register of UE identities and their locations. When there is downlink data intended for the idle-mode UE, the MME sends a Paging message including the UE's identity (device (ID) such as a Temporary Mobile Subscriber Identity (TMSI)).

The concept of "Tracking Area" (TA) is relevant to the invention to be described, and therefore will be briefly explained here. In a system such as LTE, the base stations (eNBs) form an overlapping of network of cells through which mobile devices may travel. As mentioned, the MME keeps track of UEs in the network. A tracking area is a group of cells in which a UE can move freely without having to update the MME with its location. Related to this, a Tracking Area List (TAL) is provided in LTE to allow the same cell to belong to more than one tracking area, allowing TAs to overlap and reducing signalling overhead. The UE refers to the TAL as it moves around the network, and only needs to update its location when it moves to a cell not in the TAL. The UE updates its location by sending to the network a location update message together with a device ID (e.g. its TMSI), allowing the MME to update the register.

Wireless communication systems are constructed by dividing the tasks to be performed among a plurality of layered protocols, each node or entity in the system being equipped to process data at various layers (or levels within a layer) in a protocol stack, with the protocols at corresponding layers notionally communicating with each other. Although ultimately all signalling in the system is carried by the lowest, physical layer, this hierarchical arrangement allows each layer to be considered independently.

FIG. 2 shows protocol layers for the control plane employed in LTE, by way of example. Each shaded box represents a different node in the system: UE, and eNodeB, and MME. Within each node, the protocols form a "protocol stack". Thus, transmission of messages between nodes in a radio network, such as between the UEs and eNBs in FIG. 1, involves the use of multi-layer protocol stacks.

The protocols shown in FIG. 2 can be grouped in various ways. For example, the NAS (Non-Access Stratum), S1-AP (see below) and RRC (Radio Resource Control) protocols shown in FIG. 2 may be labelled Layer-3, the PDCP, MAC and RLC protocols as Layer-2, and the PHY (Physical layer) and L1 as Layer-1. Broadly speaking, on the transmission side Layer-3 is responsible for constructing message contents relating to mobility and session management for example, which are passed down to Layer-2 for further processing, including addition of headers etc. for transport purposes, and then passed down further to Layer-1 for transmission.

More particularly, Layer-2 includes a Packet Data Convergence Protocol (PDCP) sub-layer, a Radio Link Control (RLC) sub-layer, and a Media Access Control (MAC) sub-layer. The MAC layer forms S1 signalling messages or other data into data units (MAC PDUs) suitable for transmission over the radio network. These are received by the physical layer PHY, which provides the link from each network node to the radio resources of the network. On the reception side, starting at Layer-1 each layer decodes the header inserted in the corresponding transmission-side layer to allow reconstruction of a data unit, which is then passed up to the next higher layer.

Signalling messages are exchanged between the UE and eNodeB across the Uu interface, indicated by a vertical dashed line in FIG. 2. The S1 control plane interface (S1-MME) is defined on the link between the eNB and the MME.

The application layer signalling protocol is referred to as S1-AP (S1 Application Protocol). In FIG. 2, STCP stands for Stream Control Transmission Protocol. Put simply, SCTP provides a guaranteed connection over a connection-less packet network service such as Internet Protocol, IP. The SCTP layer ensures delivery of S1-AP application layer messages through SCTP association(s) established between two nodes. Application layer protocols submit their data to be transmitted in messages to the SCTP transport layer. SCTP places messages and control information into separate chunks (data chunks and control chunks), each identified by a chunk header. A message can be fragmented over a number of data chunks, but each data chunk contains data from only one user message. SCTP chunks are bundled into SCTP packets and each SCTP packet, which is submitted to the IP layer, consists of a packet header, SCTP control chunks when necessary, followed by SCTP data chunks when available.

The above mentioned SCTP "association" is a relationship between two SCTP endpoints. An endpoint is a set of transport addresses and a transport address consists of a network layer address and a port number. SCTP provides multi-streaming, in which several connections (streams) are bundled together into a single SCTP association, and each message sent over an SCTP association is assigned to a particular stream. All data within a stream is delivered in order with respect to other data in that stream, but data in different streams have no order constraints.

SCTP is an example of a "multi-homing" protocol. Multihoming can be used, for example, to increase the reliability of an IP-based network. In multi-homing, transparent failover is enabled between redundant network paths by using more than one IP address for one or both endpoints of a connection, as shown in FIG. 3. In FIG. 3, the endpoints of the SCTP connection are a Local Node (STCP Local Endpoint) and a Remote Node (SCTP Remote Endpoint). Each endpoint monitors the reachability of the secondary addresses of its peer so that it always knows which addresses are available for the failover. An SCTP identifies the endpoints such as IP-L 1, IP-L1 and IP-R1, IP-R2 shown in FIG. 3, but does not identify a service which may be provided by means of the SCTP association.

Although conventionally, a mobile device employs only one RAT at a time for its communication, mobile devices such as smartphones are increasingly capable of supporting more than one RAT simultaneously, for example LTE and Wi-Fi (the IEEE802.11xx group of standards). Moreover, several radio access networks (RANs) employing various RATs may be available in the same place, offering the possibility of multi-RAT communication to increase the overall bandwidth available to the UE. There may be some commonality of hardware between such radio access technologies. Thus for example the same base station unit may act as both an eNB in LTE and an access point (AP) for Wi-Fi communication. Such a unit is referred to henceforth as a BS/AP. Also, for convenience, the term "RAT" is also used to denote a wireless communication system employing a specific RAT. Thus, "multi-RAT communication" means communication via a plurality of wireless communication systems which involve the use of a plurality of different RATs.

Recently, the concept of "virtualisation", which for some time now has been applied in wired computer systems, has received attention for use in mobile networks. This concept can be applied in various ways.

Firstly, and most commonly to date, mobile virtualisation can be used to provide hardware virtualisation on a mobile phone or connected wireless device. It enables multiple operating systems or virtual machines to run simultaneously on a mobile phone or connected wireless device, using a hypervisor to create secure separation between the underlying hardware and the software that runs on top of it. Such virtual machines are one example of "independent devices" as referred to below. The mobile industry became interested, in 2008, in using the benefits of virtualisation technology for mobile phones and other devices like tablets, netbooks and machine-to-machine (M2M) devices. One such example is using mobile virtualisation to create low-cost Android smartphones.

Semiconductor vendors such as ST-Ericsson have adopted mobile virtualisation as part of their low-cost Android platform strategy. Another use case for mobile virtualisation is in the enterprise market. Today, many consumers carry two mobile phones: one for business use and another for personal use. With mobile virtualisation, mobile phones can support multiple domains/operating systems on the same hardware, so that the enterprise IT department can securely manage one domain (in a virtual machine), and the mobile operator can separately manage the other domain (in a virtual machine). For example, VMware's Horizon Mobile allows employees to use a phone's native operating system for personal tasks, but then switch over to a virtual machine that runs a separate OS for business tasks. Thus, in effect, the virtual machines constitute independent devices in the same way as if the user carried multiple smartphones.

Secondly, mobile virtualisation is starting to be applied in the sense of the separation of a mobile device (in the form of a physical device supporting a particular service) and an identifier (e.g. associated with services an end user subscribes to). In other words, an end user may access a service from independent physical devices using the same identifier. Service continuity in this case, i.e. how to seamlessly switch a service from one device to another, becomes crucial. There are several solutions at application level. One such example is Amazon's Whispersync that allows synchronisation of books, videos, personal documents, and games across supported Kindle devices and apps. A user can pick up reading where they left off and view the bookmarks, highlights, and notes that were created on another device. Another example is Apple's Handoff, by which iPhone users running OS X Yosemite can seamlessly transition between workflows on their iPhone device and on a Mac laptop computer.

However, in this second sense, virtualisation is so far only available with specific applications and combinations of hardware. More general mechanisms are required before mobile virtualisation in this sense can be made available widely.

SUMMARY OF THE INVENTION

According to a first aspect of the present invention, there is provided a method for wireless communication between independent devices and a network, comprising:
forming a virtual terminal from a plurality of independent devices;
creating a service ID for a service to be provided to the virtual terminal, wherein the service ID is associated with one or more of the plurality of independent devices;
associating the virtual terminal with the network, the association supporting the service by using the service ID; and
providing the service to at least one independent device of the virtual terminal.

The independent devices referred to above may be physically distinct (e.g. different mobile phones) or modules within one device that behave independently in the context of the invention (e.g. logically distinct). For example, a smartphone may have multiple radio interfaces available (e.g. LTE and Wi-Fi radio modems) which are operated in such a way that direct communication or interaction between them is be handled by the terminal itself (as part of the intelligence residing in the phone), and the radio modems appear to be independent devices, at least as far as the communication network is concerned.

Therefore the devices that are provided with a service under a service ID need not make use of any direct connections or interfaces between the devices (at least from the communication system viewpoint). Thus the invention will be applicable in the case that there are no connections or interfaces between the devices, or if such connections/interfaces are present, they need not be used by the wireless communication system providing the service according to the invention.

Consequently, the virtual terminal may be constituted by a group of independent physical devices, a group of virtual machines as a result of virtualisation on one or more physical device, or a combination of one or more independent physical devices with at least one virtual machine. Below, for ease of explanation, it is assumed that the virtual terminal typically includes a plurality of independent physical devices.

The virtual terminal may have one end user or a plurality of end users. Although end users are typically human this is not essential; a machine could also be an end user.

Preferably, the creating and associating referred to above are performed using a Terminal Management Entity (TME) connected to the network. This TME can control, manage and maintain the terminals (including any virtual terminals) associated with an end user. The TME is thus analogous in some ways to a MME (and may be co-located with a MME).

Preferably, a multihoming protocol is used as the transport layer protocol for the logical interface between the virtual terminal and the TME. The multi-homing transport protocol may be Stream Control Transmission Protocol (SCTP), the associating step creating at least one SCTP association.

The method may further comprise selecting an independent device as one element of the virtual terminal with which to send a location update in relation to the service. Here, it is assumed that the independent devices (physical and/or virtual) which make up the virtual terminal are normally either co-located or in proximity to one another, so the location of one independent device can stand for the location of the virtual terminal.

The method may further comprise selecting an independent device of the virtual terminal with which to receive paging in relation to the service, as well as selecting an independent device of the virtual terminal with which to respond to paging in relation to the service. Again, it should be understood that the independent device may be a physical device or a module (virtual machine) within a physical device. It should be noted that the same independent device is not necessarily selected in each case.

Further features of the invention relate to determining the most suitable independent device to receive the service. For example one independent device may be better able than other elements of the virtual terminal to present content to a human user. The method may further comprise selecting an independent device of the virtual terminal to which to deliver the service, and/or handing over delivery of the service from one independent device of the virtual terminal.

Determining the most suitable independent device for these purposes may involve the use of intelligence local to the virtual terminal. (By contrast the TME is remote and manages potentially a large number of virtual terminals in the network). Thus, in an embodiment the virtual terminal is provided with a local control module, such as a suitably-programmed processor of the independent device of highest capability among independent devices constituting the virtual terminal. Then, the above mentioned selecting and/or handover can be determined by, or with the involvement of, the control module rather than being solely under network control.

According to a second aspect of the present invention, there is provided a wireless communication system comprising:
   a virtual terminal formed from one or more independent devices; and
   a terminal management entity for managing the virtual terminal, the terminal management entity arranged to:
   create a service ID for a service to be provided to the virtual terminal, the service ID shared by the one or more independent devices; and
   associate the virtual terminal with the network through use of a multi-homing transport protocol, the association supporting the service by using the service ID.

According to a third aspect of the present invention, there is provided a Terminal Management Entity connected to a wireless communication system, the Terminal Management Entity arranged to:
   register a virtual terminal, formed from one or more independent devices in the wireless communication system;
   create a service ID for a service to be provided to the virtual terminal, the service ID shared by the one or more independent devices;
   form an association of the virtual terminal with the network through use of a multi-homing transport protocol, the association supporting the service by using the service ID; and
   manage provision of the service to at least one independent device of the virtual terminal.

According to a fourth aspect of the present invention, there is provided a virtual terminal for use in a wireless network, comprising:
   a plurality of independent wireless devices; and
   a control module for communicating with a Terminal Management Entity in the network, the control module arranged to:
   register the virtual terminal with the Terminal Management Entity;
   receive from the Terminal Management Entity a service ID for a service to be provided to the virtual terminal, the service ID associated with one or more of the plurality of independent devices; and
   perform with the Terminal Management Entity an association of the virtual terminal with the network, the association supporting the service by using the service ID.

The above mentioned control module may also be involved in managing reception of the service in at least one independent device of the virtual terminal.

According to a fifth aspect of the present invention, there is provided software which, when executed by a processor of a computer connected to a wireless communication system, provides the Terminal Management Entity, or the control module of the virtual terminal referred to above. Such software may be stored on a computer-readable medium.

Thus, embodiments of the present invention provide a mobility support framework for the identified multi-device use cases in a mobile system with one or more access networks available for the end users. A Terminal Management logical entity is assumed in the network, which controls, manages and maintains the devices (including any virtual machines) associated with an end user by treating those devices as a virtual terminal. The following functions (that require coordination among multiple logical entities in a network) are proposed: 1) service specific location update procedure where multiple devices sharing a common Service ID may be registered with location updates; 2) paging and service delivery procedure which allows a specific service to be delivered to a most suitable device; 3) handover procedure which enables an on-going service session to be handed over between two devices. In this way, services can be provided flexibly to multiple independent devices of the virtual terminal without the need for individual configuration of specific applications being run.

BRIEF DESCRIPTION OF THE DRAWINGS

Reference is made, by way of example only, to the accompanying drawings in which.

DETAILED DESCRIPTION

Embodiments of the present invention are aimed at scenarios where an end user (e.g. a human, a machine, or a group of humans or machines, etc.) accesses a subscribed service provided by an (virtual) operator using multiple independent devices, each of which as already mentioned may be a distinct physical device or a module/virtual machine within a physical device. This group of devices is regarded as, and managed as, a "virtual terminal" for the purposes of the present invention.

Various examples may be mentioned for such scenarios.

An example of a human using multiple physical devices would be similar to that mentioned in the introduction of a user who wishes to synchronise books, games etc across multiple devices such as a smartphone and a tablet computer.

An example of a group of humans would include, for example, a group of people in the same location who wish to share common service subscription temporarily in order to view a video stream of a sports event, or a classroom in which the users each have their own display (e.g. tablet) but there is also a common display such as a projector.

As a machine example, a network-connected car may have multiple physical devices such as a controller, display, sound system which may consume services of a mobile network. For example when streaming video, it is important to deliver video to the display and audio to the sound system.

Thus, in such scenarios service delivery to the most appropriate physical device (s) is the problem. Mobility support in such scenarios is of special interest: efficient mobility support is critical in terms of not only handover of the on-going service from one physical device to another, but also service delivery to the most appropriate physical device(s).

In short, the problem requiring a solution is how to efficiently handover an on-going session between independent devices, as well as deliver the service to the most suitable independent device(s).

This invention is based on, but not limited to, a mobile system with one or more access networks (e.g. 3GPP networks, and WiFi systems) available for the end users, where basic infrastructure is provided by one or more operators, shared by several virtual operators. The invention proposes a mobility support framework for the identified multi-device use cases.

The present invention introduces the concept of a Terminal Management logical entity (TME), which is provided in the network to control, manage and maintain the devices (including any virtual machines) associated with an end user. The TME is thus analogous in some ways to a MME (and may be co-located with a MME), but is equipped for mobile virtualisation. In contrast to known solutions such as Apple's Handoff, it is not restricted as regards the applications in use or the configuration of the mobile devices.

Figure 4:
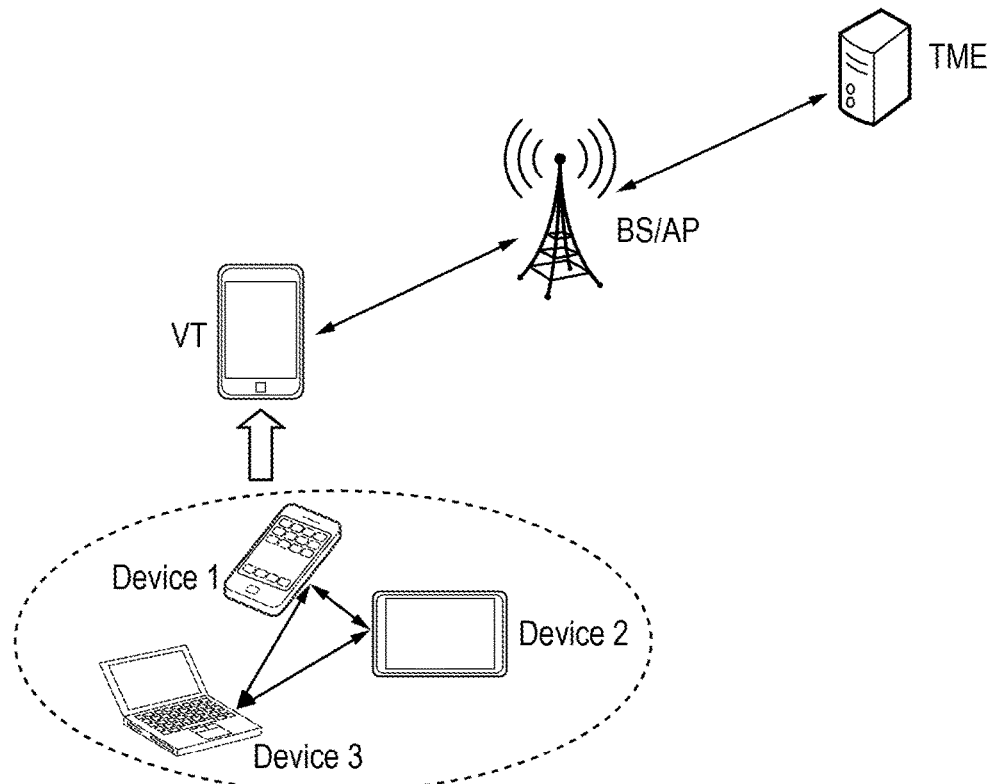
FIG. 4 illustrates the concept of a "virtual terminal" employed in embodiments of the present invention.

An example of the basic architecture is illustrated in FIG. 4. For ease of description, it is assumed here that the virtual terminal consists of a plurality of independent physical devices. For convenience, "a user" will be referred to, denoting a person who uses the virtual terminal, but as already mentioned the user could be a group of persons, or even a machine. In this example, a plurality of physical devices labelled Device 1, Device 2 and Device 3 respectively, are located in the vicinity of one another, and forms a group. Each Device may be a UE of an LTE-based wireless communication system for example.

It is assumed that the use wishes to receive a service using the wireless communication system; for example, to browse the internet or stream a video. Such service delivery to the user normally occurs in the context of running an application on at least one of the wireless devices. The group of devices is treated as a Virtual Terminal VT which is regarded as a single entity for service delivery purposes. Thus, the VT can be regarded as communicating with a base station/access point BS/AP, which forwards control signals from the TME to the VT and passes control signalling of the VT back to the TME. Meanwhile, user data delivery to the virtual terminal can occur by delivering the data to one or more of the independent devices of the virtual terminal in the conventional manner. The virtual terminal concept is thus applicable mainly to the control plane rather than the user plane.

The basic functions of the TME include:

Mobility support between different access networks;

Mobility support for different devices associated with the same end user;

Reachability and the related procedures (including control and execution of paging retransmission).

Figure 5:
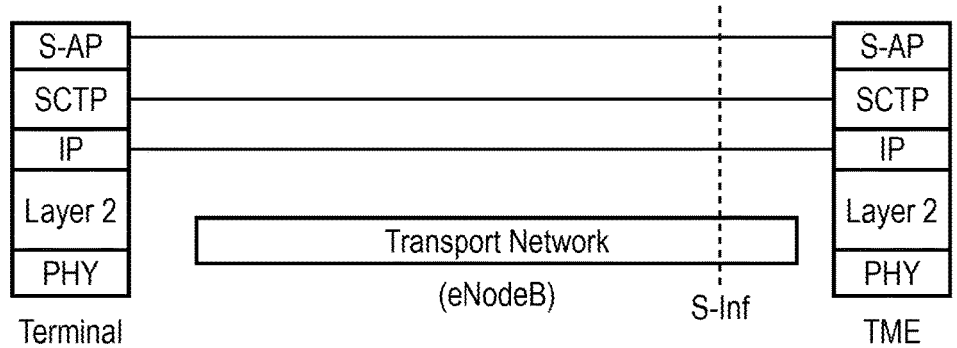
FIG. 5 shows an example protocol architecture for use with a virtual terminal and in a Terminal Management Entity, TME.

As another novel feature of the present invention, a logical interface is set up between a virtual terminal and the logical entity. FIG. 5 illustrates an example protocol architecture for the logical interface (S-Inf as shown in FIG. 5), where the logical entity is assumed to be co-located with MME. In FIG. 5, only the Terminal and TME are shown for simplicity; other parts of the network including the eNodeB are represented by "Transport Network" in the Figure.

Figure 1:
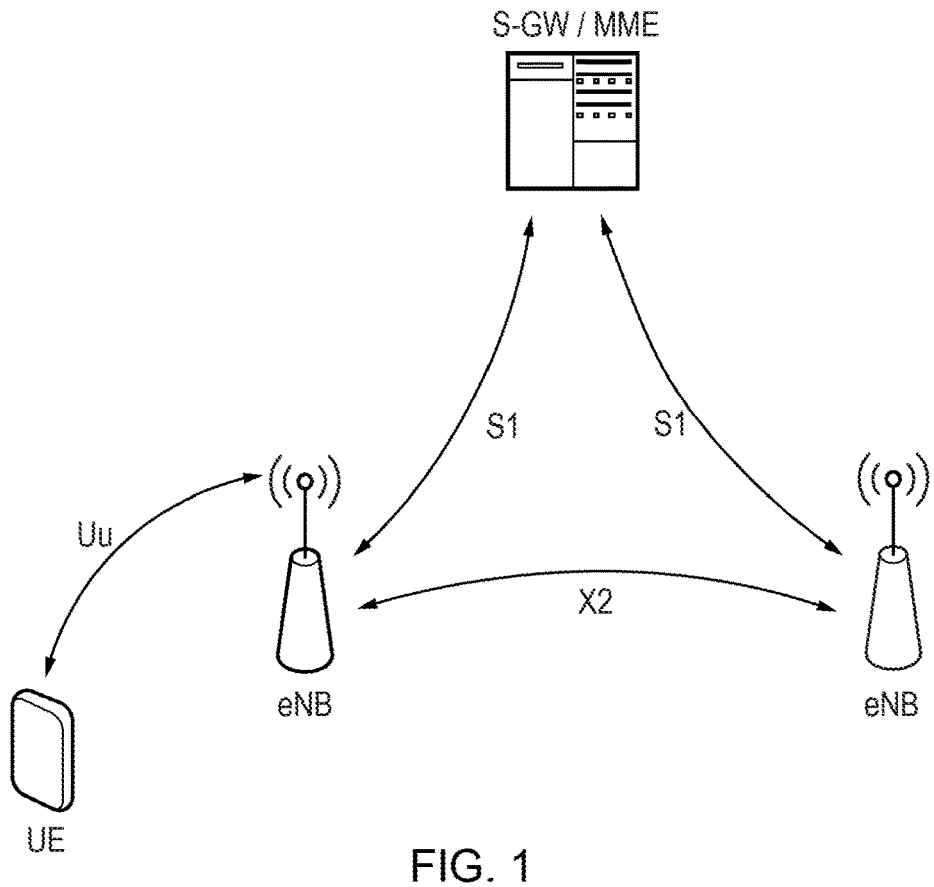
FIG. 1 shows a conventional system architecture in LTE.
Figure 2:
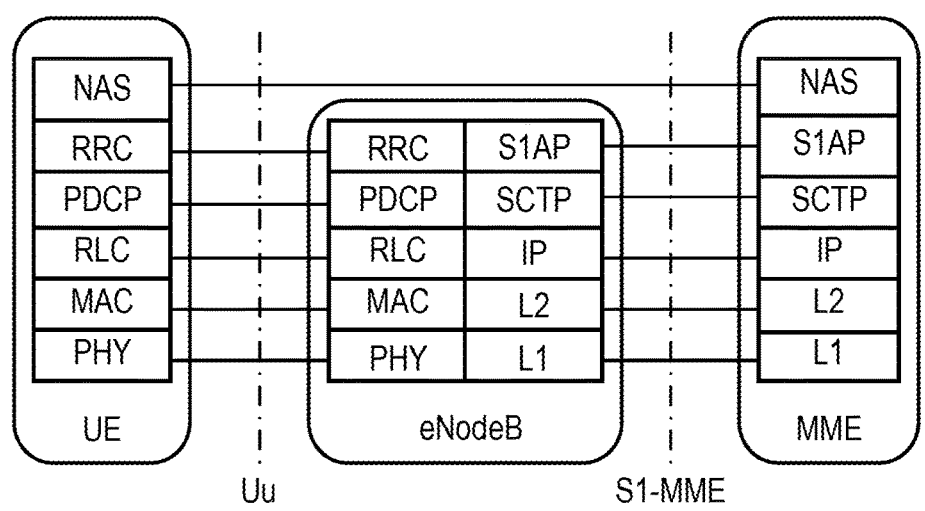
FIG. 2 shows the protocol layers for the control plane in an LTE system.
Figure 3:
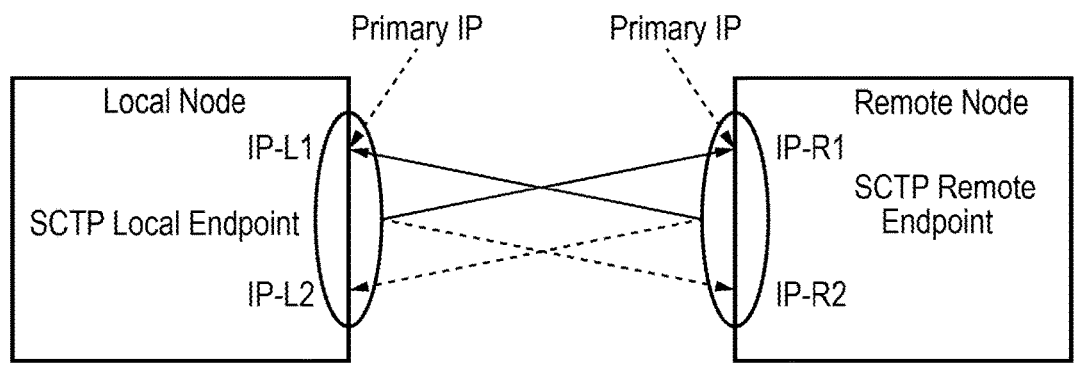
FIG. 3 illustrates multi-homing in SCTP.

The control signalling (S-AP as shown in FIG. 5) is on top of a multi-homing transport protocol, e.g. SCTP as shown in the figure, which allows one or more associations to be set up between a pair of logical entities (e.g. a terminal and an TME) where more than one these pairwise associations may have the same shared ID associated with an end user. SCTP is provided on top of IP in the same manner as shown in FIG. 2. In embodiments, a "service ID" is introduced as this shared ID, which can be associated with one or a group of devices sharing the same service subscription, the service subscription being based on some contract or agreement between the user (or owner) and a mobile operator or virtual operator. It should be noted that such an ID does not exist under current mobile communication standards, in which services are associated with a single device. Nor can SCTP provide such a service-level identity.

It may not be necessary for all the devices forming a virtual terminal to share a single service subscription. For example, a virtual terminal might be formed with at least some devices which are available without a subscription (e.g. a publicly available screen), or the subscriptions for different devices may be with different operators. Therefore, in general the service ID is associated with one or more of the constituent devices of the virtual terminal.

For example, a TME can set up one SCTP association with Device 1 and another with Device 2, where these two devices share the same service ID. Thus, the present invention expands the conventional meaning of "multi-homing" to cover this case.

It should be noted that the same end user may have use of multiple shared IDs at the same time (for different services being accessed simultaneously). For example one service ID may be for business usage and another for private usage.

Some embodiments of the present invention will now be described, referring to: (a) Association setup; (b) Paging; (c) Handover. In general, unless otherwise indicated, the embodiments described below are applicable but not limited to the following cases:

A virtual terminal corresponds to one or more independent physical devices, which are not necessary always in the same location (e.g. not sharing the same Tracking Area list);

A virtual terminal corresponds to a group of at least two independent physical devices, which are always in the same location (i.e. at least sharing the same Tracking Area list);

A virtual terminal is associated with at least one service ID;

A group of physical devices corresponds to a virtual terminal

Whilst it is constituted by a group of devices, the virtual terminal may also involve some form of intelligence (most likely a software module), which manages the constituent devices and thus contributes to imparting an identity to the virtual terminal.

The embodiments are assumed to be applicable to cases where one or more of the physical devices are mobile (e.g. UEs in an LTE system), but the use of the invention is not restricted to such situations (i.e. one or more of the physical devices could be fixed). The invention is applicable where the physical devices use wireless communication, but is not restricted to this situation (e.g. some communication links to the physical devices may use wired connections).

The invention is not restricted to use of a single RAT (Radio Access Technology). For example a physical device may be capable of using more than one RAT through different modules of the physical device, and a given service ID may be applicable across multiple RATs.

(a) Association Setup Procedure

Figure 6:
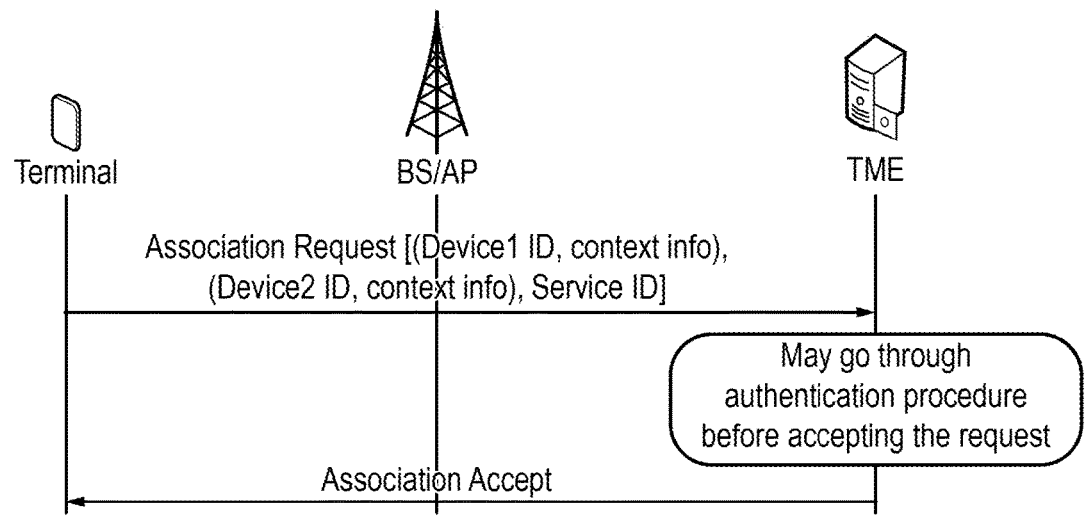
FIG. 6 illustrates an association setup procedure provided in an embodiment of the present invention.

FIG. 6 illustrates an association setup procedure employed in an embodiment of the present invention. In FIG. 6, "Terminal" represents at least two devices having respective device IDs "Device1 ID" and "Device2 ID".

Association Setup procedure may take place when a virtual terminal attaches to a system (for example, a wireless communication network), and is normally conducted separately from requesting a service. The purpose of this procedure is to set up a logical association between a virtual terminal and a Terminal Management logical entity (TME), where at least one physical device is registered. This procedure is at the NAS (Non-Access Stratum) level and therefore does not involve the eNodeB directly (in other words the eNodeB merely forwards the relevant messages without processing them).

The TME retains records of devices for an extended period, not merely for the duration of a single service session, and therefore is able to recognise devices which have registered at some time in the past. Such records include details of services used as well as identities of devices.

The service ID is distinct from the Device IDs, and is related to a service subscription of the user or owner of at least one of the group of devices, and may be allocated when a service contract is agreed. If agreed prior to registering the devices with the TME, the service ID will need to be notified to the TME. Otherwise, the TME can be involved in allocating the service ID and will therefore be aware of it.

A Device ID is assumed to uniquely identify a device associated with a Service ID. However, there is no need for a virtual terminal itself to have a device ID, and the virtual terminal can be managed through one or more service IDs.

As an example, a user has one mobile phone with two sets of service subscriptions, one for business use and another for private use. Each set of service subscriptions can be associated with a virtual terminal, e.g. VT1 for business and VT2 for private use. VT1 is associated with one service ID (Service ID: Ser1). The example of a message for requesting the association is:

Association Request [(Dev11, context info), Ser1].

Assuming that VT2 is associated with Service ID: Ser 2 then the association request would take the form of:

Association Request [(Dev12, context info), Ser2].

Here, Dev11 and Dev12 are not necessarily identical although they map to one physical device.

Note that in this procedure multiple devices may be registered all of which (once a service has been requested, and a corresponding service ID allocated) will share the same service ID associated with one end user. The registered devices are not necessarily already attached to the system. An additional Association setup procedure may take place when a previously registered device attaches to the system. Context information of each device, e.g. location, capability, etc. may be included in the request message. For example, where the wireless communication network includes a 3GPP network, UE context information specified in 3GPP may be made part of the records stored in the TME.

(b) Paging

Figure 7:
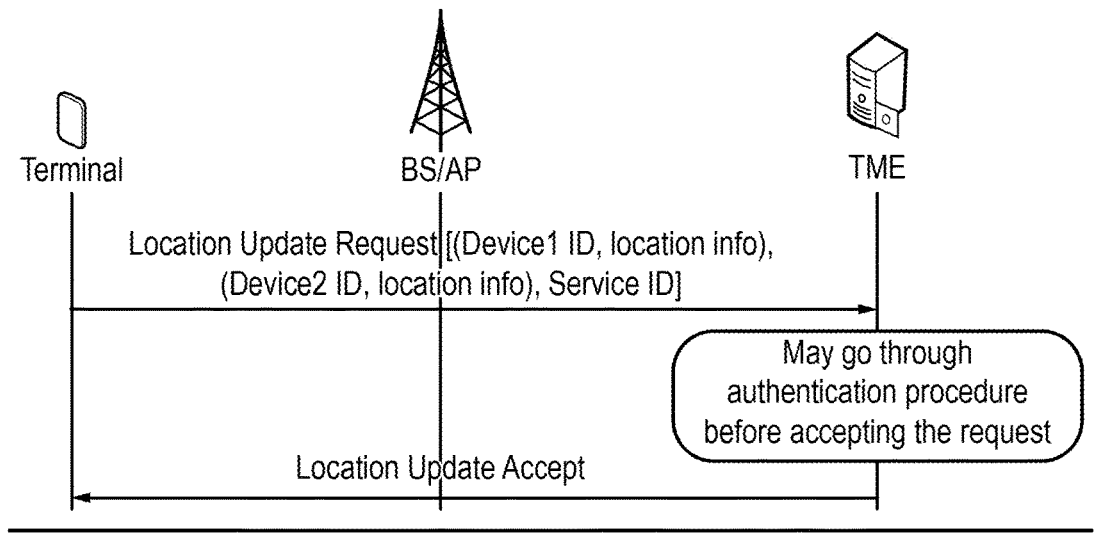
FIG. 7 illustrates a location update procedure provided in an embodiment of the present invention.
Figure 8:
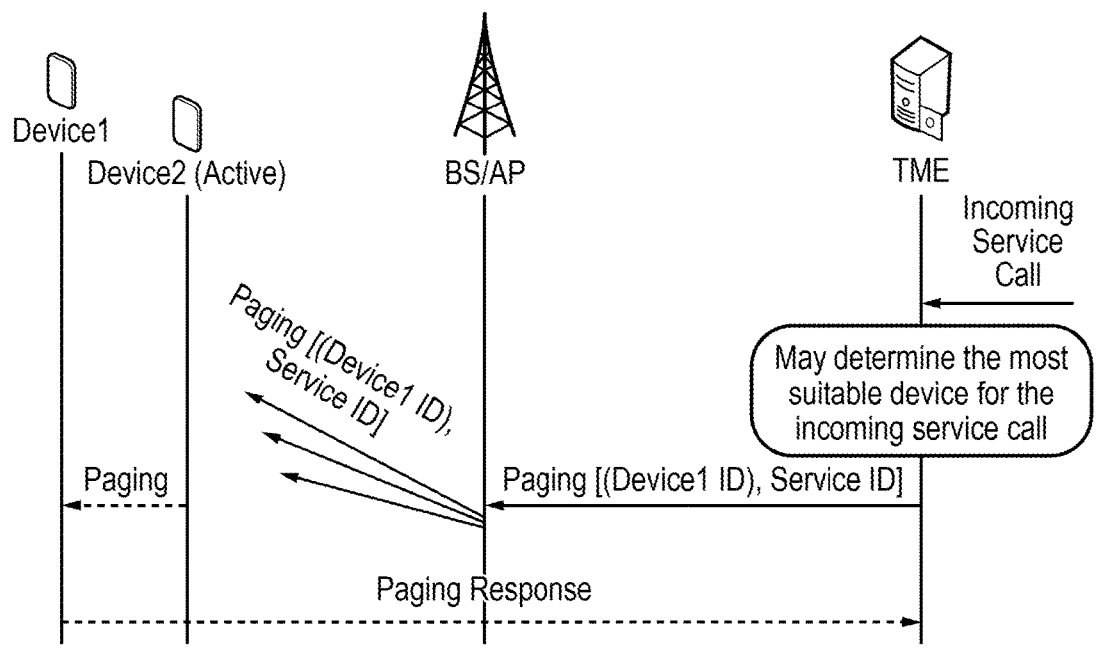
FIG. 8 illustrates a paging procedure provided in an embodiment of the present invention.

In this embodiment, two procedures are proposed in order to efficiently locate and signal to the most suitable device(s) concerning an incoming service request, as shown schematically in FIGS. 7 and 8.

First, a location update is performed as shown by FIG. 7.

Similar to the existing location update procedures specified in 3GPP, the purpose of this procedure is to update the network with the location of devices. As shown in FIG. 7, the Terminal updates the TME with the location information of multiple devices associated with a service ID. A Service ID uniquely identifies a service subscription of an end user (e.g. a human or a machine), which may be associated with a virtual terminal, which may be mapped into one or more physical devices.

This update procedure may be triggered by the change of the location of one or more devices, or upon the expiry of a timer for periodic update.

In one use case, location update performs by one device on behalf of a group of multiple devices associated with a common Service ID. Usually, this device would be the physical device in the group with the highest capability to perform the location update (other factors like battery level could also be taken into account). The device which performs the update would be one already connected to the network, either at RAN level (with RRC connection) or at Core Network level (with or without RRC connection).

However, all the devices involved in a Locate Update procedure need not necessarily share the same location (e.g. same tracking area list). Inter-device communication (e.g. using a low power communication method) may take place which updates the locations of each member of the group.

In another use case, it is also possible for the devices in the group to perform location updates independently. In this case, all devices performing locate updates are considered active to the network.

It is also possible to include multiple Service IDs in the location updates, which are associated with this group of devices.

After the location update in FIG. 7, paging can be conducted in accordance with FIG. 8. Paging is necessary when the terminal is not connected to the network at the RAN level.

When there is an incoming call (voice or packet) for the virtual terminal based on a specific Service ID, the paging procedure takes place similar to the existing defined in 3GPP. The network (the TME, for example) sends a Paging message with one or more identities of the terminal (as registered, e.g. the Service ID, and/or a specific Device ID) to each eNodeB belonging to the tracking area(s) in which the terminal is registered. The recipient eNB (s) then broadcast the paging message to devices registered in the location update procedure.

The network (TME) may select a most suitable device based on service requirement of the incoming call, for which the network may include the specific Device ID in the Paging message in addition to the Service ID.

Incidentally, it is assumed above that the physical devices are mobile, but if the device or a group of devices are stationary, this situation can be stored as part of the context information and in this case a smaller area than the Tracking Area (such as one cell of an eNB), can be used.

It is assumed that at least one device monitors the network signal regularly; and not all devices associated with a Service ID are in active mode, monitoring the network signals due to various reasons, e.g. energy saving. Upon receipt of the paging, the active device checks the incoming service and, if available, the specific Device ID. If its Device ID matches the ID in the message and/or the device decides it is suitable for the incoming call, it responds to the paging. If its Device ID does not match the ID in the message and/or the device decides it is not suitable for the incoming call and identifies a suitable device instead, it forwards the paging to the suitable device and it may also respond to the paging by indicating the ID of the suitable device ("device" here means physical device).

In a case where the same physical device is associated with multiple virtual terminals/service subscriptions, it is possible that receipt of a paging message by that device would lead to certain software modules being activated for the intended service.

In one use case, as a result of paging for an incoming call for a specific service, the actual service may be delivered to a different device than the one specified in the paging message. For example, the specified device may act as a relay for the different device, or both may share the service (in the above mentioned example of a vehicle, a video clip may be delivered to both a dash-mounted display and to the vehicle audio system, both the display and audio system being registered with the network for certain services).

(c) Handover Procedure

This embodiment focuses on the handover handling between two devices that are associated with one service subscription/the same virtual terminal. The handover may be imitated by the terminal or by the network, and the source device and target device are not necessarily connected to the same BS/AP. It will be understood that this form of handover may be within the virtual terminal, rather than changing the BS/AP with which the virtual terminal is communicating. It may therefore be called an "intra-virtual terminal" handover.

Figure 9:
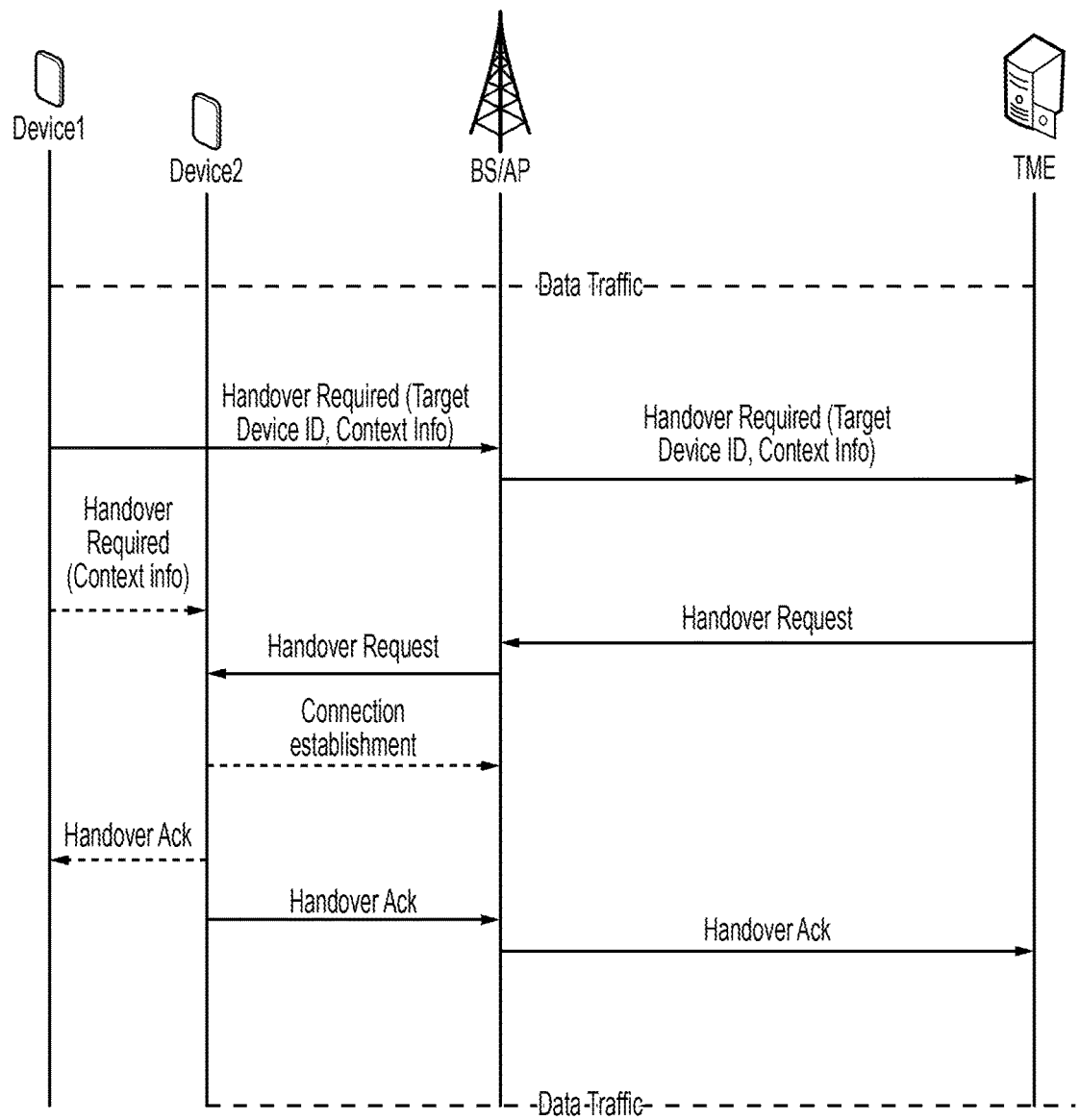
FIG. 9 illustrates a handover procedure provided in an embodiment of the present invention.

FIG. 9 depicts an example handover procedure initiated by the device. A device may initiate a handover due to various reasons, for example, the low battery level or triggered by the end user. The source device (Device1 in FIG. 9) initiates the handover by sending a Handover Required message to the current BS/AP, then to the TME. Incidentally, although it is not essential for the BS/AP to understand this message (and it would not understand it under current standards) it may be beneficial for the BS/AP to understand the message. This message may include the target Device ID and context information, such as the information about the intended service to be handed over to the target device. It should be noted that normally only one service at a time would be handed over, any other services simultaneously provided being left unaffected. Meanwhile, the source device may also send a message to the target device via short distance communication. The TME triggers the handover, upon the receipt of the request, to the target device.

In a variation of this embodiment, the radio connections to Device1 and Device2 may be via different BS/APs and/or different RATs. In the case of different RATs, the same TME would manage both (or all) RATs.

To summarise, an embodiment of the present invention can provide a wireless communication system comprising a virtual terminal formed from one or more independent devices and a terminal management entity for managing the virtual terminal. The devices may be independent physical devices (smartphones, tablet computers and so forth), virtual machines/modules of physical devices, or a combination of both. The virtual terminal and terminal management entity communicate via a base station and/or access point. The terminal management entity creates a service ID for a service to be provided to the virtual terminal, the service ID being shared by the one or more independent devices, each of which has its own device ID. The TME forms an association of the virtual terminal with the network through use of a multi-homing transport protocol such as SCTP, the association supporting the service by using the service ID. For service delivery, paging and handover purposes the devices of the virtual terminal are treated as a single entity by the TME, whilst individual devices within the virtual terminal may perform an intra-virtual terminal handover.

Features in embodiments include the following:
- Creation of a service ID for a service to be delivered to a group of independent devices (physical devices and/or or virtual devices mapping on to a physical device)
- Creation of an association between a group of independent devices to support the service using the service ID
- Using a protocol architecture (like FIG. 5) which includes a TME and the interaction between a Virtual Terminal and a TME, as well as the multi-homing transport protocol
- Selection of at least one device in the group to send location updates in relation to the service
  - configured by the network
- Selection of at least one device in the group to receive paging in relation to the service
  - paging configured by the network, or
  - reception may be up to implementation
- Selection of at least one device in the group to respond to paging in relation to the service
  - configured by the network, or
  - selected by the group (by assuming one device as the leader based on capability and/or under management of an intelligence (probably in the form of a software module) that controls/manages the devices associated with a terminal
- Selection of at least one device in the group to receive the service
  - configured by the network, or
  - selected by the group
  - optionally with involvement of a human user (for example through settings of the devices or by responding to a pop-up window that allows the use to make a decision on the fly)
- Handover of delivery of the service from one device to another in the group Various modifications are possible within the scope of the invention.

Although reference is made to forming a virtual terminal from various independent devices of the same user or group of users, it should be noted that more than one virtual terminal can be defined for the same user or group of users, such as in the above mentioned example of VT1 and VT2 of the same user. Membership of devices among the virtual terminals may be overlapping. In other words, the same independent physical device such as a smartphone could be associated with more than one virtual terminal and therefore be associated with more than one service ID.

In the above example, the TME was assumed to be co-located with the MME. However, this is not essential. The TME may be provided anywhere within the core network (for services requiring wide area coverage), or, where services to be shared among devices are localised, the TME functionality could be contained in a BS/AP.

Although the invention has been described in the context of a wireless communication network, it is not confined to such use. Embodiments of the present invention may be applied to communication systems which combine wireless and wired communication or even wired-only networks.

In the above description, the Association Request was treated as distinct from a service request. However, one may imply the other. That is, the Association Request may also imply a service request in some circumstances. For example: a user has a mobile phone with him, and is in a cafe where some facilities are available for customers (such as a network-connected television). When the user wishes to watch an online video, he can associate the television with his service subscription by sending an Association Request, and cause the video to be delivered to the virtual terminal instead of to the mobile phone. The audio could be delivered to the mobile phone or to separate earphones. In the prior art, it would be necessary for the user first to be delivered to the mobile phone and then for the mobile phone to communicate with the television (perhaps by Bluetooth) to display the video.

In the above description, it was assumed that a Association Request comes from a virtual terminal rather than from a physical device which is an element of a virtual terminal. However, the latter possibility might also be made available, in which case it would be preferable to distinguish in some way an Association Request from a virtual terminal from one from a physical device.

INDUSTRIAL APPLICABILITY

The invention can be applied to wireless communication systems, and has advantages such as the following:
- Efficient support of multiple devices associated with one or more service subscriptions;
- Flexible service delivery to the most suitable device(s);
- Efficient handover among devices.

What is claimed is:

1. A method for wireless communication between independent devices and a network, comprising:
   forming a virtual terminal from a plurality of independent devices;
   creating a service ID for a specific service subscribed by a user and to be provided to the virtual terminal, wherein the service ID is associated with one or more of the plurality of independent devices;
   associating the virtual terminal with the network wherein the association between the virtual terminal and the network is through the use of a multi-homing protocol, the association supporting the service by using the service ID;
   selecting, based on a service requirement, at least one independent device of the virtual terminal to which to deliver the service; and
   providing the service to the at least one independent device of the virtual terminal.

2. The method according to claim 1 wherein at least two of the plurality of independent devices are independent physical devices.

3. The method according to claim 1 further comprising selecting an independent device of the virtual terminal with which to send a location update in relation to the service.

4. The method according to claim 1 further comprising selecting an independent device of the virtual terminal with which to receive paging in relation to the service.

5. The method according to claim 1 further comprising selecting an independent device of the virtual terminal with which to respond to paging in relation to the service.

6. The method according to claim 1 further comprising handing over delivery of the service from one independent device of the virtual terminal to another independent device of the virtual terminal.

7. The method according to claim 1 further comprising determining one independent device of the virtual terminal as a local manager of the virtual terminal.

8. The method according to claim 1 wherein the creating and associating are performed using a Terminal Management Entity in the network.

9. The method according to claim 1 wherein the service includes at least one of browsing the internet and streaming a video.

10. The method according to claim 1 wherein each of the independent devices has a device ID, and the selecting selects the at least one device most suitable to receive the service based on the service requirement, the service ID, and the device ID.

11. A wireless communication system comprising:
a virtual terminal formed from a plurality of independent physical wireless devices; and
a terminal management entity for managing the virtual terminal, the terminal management entity being a computer connected to the wireless communication system and having a processor, the processor arranged to:
create a service ID for a specific service subscribed by a user and to be provided to the virtual terminal, the service ID associated with one or more of the plurality of independent physical wireless devices;
associate the virtual terminal with the network wherein the association between the virtual terminal and the network is through the use of a multi-homing protocol, the association supporting the service by using the service ID;
manage provision of the service to at least one independent physical wireless device of the virtual terminal; and
select, based on a service requirement, at least one independent device of the virtual terminal to which to deliver the service.

12. A Terminal Management Entity in the form of a computer connected to a wireless communication system and having a processor providing:
means to register a virtual terminal, formed from a plurality of independent devices in the wireless communication system;
means to create a service ID for a specific service subscribed by a user and to be provided to the virtual terminal, the service ID associated with one or more of the plurality of independent devices;
means to form an association of the virtual terminal with the network wherein the association between the virtual terminal and the network is through the use of a multi-homing protocol, the association supporting the service by using the service ID; and
a manager to manage provision of the service to at least one independent device of the virtual terminal by selecting, based on a service requirement, the at least one independent device of the virtual terminal to which to deliver the service.

13. Non-transitory computer-readable recording media storing program code instructions which, when executed by a processor of a computer connected to a wireless communication system, provides the Terminal Management Entity according to claim 12.

14. A virtual terminal for use in a wireless network, comprising:
a plurality of independent wireless devices; wherein
a processor of one of the independent wireless devices provides a control module for communicating with a Terminal Management Entity in the network, the control module comprising:
registering means to register the virtual terminal with the Terminal Management Entity;
receiving means to receive from the Terminal Management Entity a service ID for a specific service subscribed by a user and to be provided to the virtual terminal, the service ID associated with one or more of the plurality of independent devices;
associating means to perform with the Terminal Management Entity an association of the virtual terminal with the network wherein the association between the virtual terminal and the network is through the use of a multi-homing protocol, the association supporting the service by using the service ID; and
deciding means for deciding, based on a service requirement, whether said one of the independent wireless devices is suitable for providing the service.

* * * * *